3,394,086
SELECTIVE PARTIAL CONVERSION OF NAPHTHA HYDROCARBONS TO HYDROGEN
William F. Taylor, Scotch Plains, and John H. Sinfelt, Berkeley Heights, N.J., assignors to Esso Research and Engineering Company, a corporation of Delaware
No Drawing. Filed May 4, 1964, Ser. No. 365,566
4 Claims. (Cl. 252—373)

ABSTRACT OF THE DISCLOSURE

By a low level conversion (5 to 50%) of hydrocarbons in steam reforming with a catalyst of nickel interspersed with alumina containing 10 to 25 parts Ni per 90 to 75 parts per weight of $Al_2O_3$, selective conversion mainly to hydrogen is obtained at 650° to 925° F.

---

This invention is concerned with the production of a hydrogen-rich gas by a moderate reaction of naphtha hydrocarbons with steam in the presence of an effectively promoted catalyst of nickel interspersed with alumina which has a sufficiently low nickel content to make the reaction more selective for giving the gas product a higher $H_2/CH_4$ mole ratio.

A moderate reaction of normally liquid naphtha hydrocarbons with steam at relatively low temperatures, in the range of 650° to 925° F., under superatmospheric pressure is desirable for the production of a high pressure hydrogen-rich gas. The promoted low nickel content catalyst has to have the right selectivity to make the converted hydrocarbons yield mainly hydrogen; and at the same time, the catalyst has to be capable of avoiding deactivation by the steam or by carbon deposits.

There is a need for high pressure hydrogen-rich gas production which eliminates or reduces gas compression costs, e.g., in production of hydrogen for ammonia synthesis gas.

In known processes of reacting normally gaseous hydrocarbons, e.g., methane to butane, with steam in the presence of a catalyst to form hydrogen with CO or with $CO_2$ as the principal product, the reactions have been carried out at elevated temperatures, above 1000° F. It is expensive to use high pressure in such processes because of the high cost of gas compressors and the large quantity of energy expended in compressing a gas to a high pressure. The use of high reaction temperatures leads to additional difficulties of maintaining a high catalyst activity and in selection of materials of construction which can withstand both high temperatures and high pressures.

The promoted catalysts of nickel interspersed with alumina which are made more selective by adjusting their nickel content are prepared by a coprecipitation technique which is described in the copending application, S.N. 317,799, filed Oct. 21, 1963 by Taylor et al., now Patent No. 3,320,182, with respect to a high activity, high nickel-content catalyst for making a methane-rich Town Gas. These high-activity Town Gas catalysts have also been shown to be useful for converting naphtha hydrocarbons by reaction with steam to a gas rich in hydrogen with a partial conversion of the naphtha hydrocarbon feed as disclosed in the copending application S.N. 338,585 filed Jan. 20, 1964, by Taylor et al. A drawback in using the high nickel-content Town Gas catalyst for obtaining a gas rich in hydrogen is that relatively lower conversion levels are required for obtaining a high $H_2/CH_4$ ratio in the product. These high nickel content catalysts of high nickel surface area of above 20 m.²/g. are obtained by the coprecipitation method with a sufficient proportion of nickel to make the catalyst contain 40 to 60 wt. percent Ni interspersed with 60 to 40 wt. percent of $Al_2O_3$. Effective promoters for this kind of catalyst are metals of the group consisting of Ba, Sr, Cs, La, Ce, Y, Fe, K and Cu, which may be present as oxides, carbonates or alloys. Other suitable promoters may be found and used.

For making the preferred low nickel-content catalyst discovered to be more selective for the production of hydrogen by the reaction of naphtha hydrocarbons with steam at low reaction temperatures, the same kind of interspersing or coprecipitation technique is employed and the same kind of promoters may be used as in the preparation of the higher nickel-content interspersed Ni-$Al_2O_3$ catalysts. The resulting low nickel-content catalyst has a nickel content below 40% with respect to the amount of nickel and alumina, more preferably in the range of about 10 to 25 wt. percent of the Ni plus $Al_2O_3$, the alumina thus being 90 to 75 wt. percent of the Ni plus $Al_2O_3$. These low nickel-content catalysts have a nickel surface area after reduction as measured by the hydrogen chemisorption technique of about 5 to 20 m.²/g. of catalyst. The total surface area of the catalyst is in the range of 100 to 300 m.²/g. The low nickel-content catalyst can be prepared with higher proportions of promoter for increased promoter action.

The interspersing or coprecipitation technique involves coprecipitation of nickel with aluminum as hydroxides, carbonates or basic carbonates from aqueous solutions of nickel and aluminum nitrate salts by $NH_4HCO_3$ at temperatures of about 32° to 212° F., low temperature (200° to 400° F.) drying of the precipitates separated from the solutions, low temperature (600° to 925° F.) calcining of the dried precipitates in air, and low temperature (600° to 1000° F.) nickel oxide reduction or activation of the calcined precipitates by hydrogen. The promoters may be added as decomposable metal salts to the solutions in which the coprecipitation takes place or may be added to the wet precipitate. The decomposable compounds are preferably hydroxides, carbonates, basic carbonates or nitrates. The promoter metal compounds may be admixed to have the final catalyst contain about 1 to 20 wt. percent of the promoter metal. The final catalyst granules or particles are preferably of 1 to 5 mm. size or these may be compressed into larger pellets for use.

The preferred naphtha hydrocarbon feeds are hydrofined or of low sulfur content and principally contain $C_5$ to $C_{10}$ paraffins, although they may contain minor amounts of other $C_5$ to $C_{10}$ hydrocarbons, and even some $C_4$ paraffin. Hydrofined virgin naphtha fractions containing less than 3 p.p.m. of sulfur may be used. Representative naphtha feeds that were found suitable contained n-butane, 17 to 64% n-pentane, isopentane, 12 to 58% hexanes, and smaller amounts of heptanes, naphthenes, and benzene.

The naphtha hydrocarbon feed is preheated and admixed with steam, generally in a ratio of 1.5 to 3 lbs. of steam per lb. of hydrocarbon feed. High steam to hydrocarbon ratios, high temperatures and low pressures favor a higher $H_2/CH_4$ ratio, so that an economically attractive high pressure, low temperature process using a low steam to hydrocarbon ratio requires a very selective catalyst.

The naphtha hydrocarbon feed is pumped in liquid phase under a desired pressure, then preheated and admixed with steam to enter into contact with the catalyst at the desired reaction temperature and pressure, e.g., pressures of 150 to 1500 p.s.i.g. The space velocity of the reaction mixture can be controlled to give the desired amount of conversion. The mass space velocity is defined as the weight of hydrocarbon feed passed through the catalyst bed in terms of lbs. of hydrocarbon per lb. of catalyst per hour (w./w./hr.).

Test runs which are made on a pilot plant scale preferably approximate plant scale operation in space velocities and other operating conditions. Suitable flow rates of the hydrocarbon feed are in the range of 1 to 20 lbs. of hydrocarbon feed per lb. of catalyst per hour.

The following examples illustrate how the promoted low nickel-content catalyst can be interspersed with alumina. It is prepared and used to obtain the improved production of hydrogen-rich gas from naphtha hydrocarbons reacted with steam.

Example 1.—Effectively promoted low nickel-content Ni-Al$_2$O$_3$ catalyst

Add 310 g. of Ni(NO$_3$)$_2$·6H$_2$O and 1390 g. of Al(NO$_3$)$_3$·9H$_2$O to 3 liters of deionized water and bring the solution to 120° F. Then add 1390 g. of NH$_4$HCO$_3$ to the solution while stirring over an approximate 1-hour period while holding the temperature at 120° F. After the NH$_4$HCO$_3$ addition is completed, continue to stir the slurry for an additional hour at 120° F. Then remove excess water from the paste. Then dissolve 23.8 g. Ba(NO$_3$)$_2$ in 200 cc. of deionized water and add to the catalyst paste and mix well for 30 minutes. The catalyst is then dried overnight at 230° F. and calcined for 4 hours in air at 750° F. The calcined catalyst analyzed 19.4 wt. percent nickel and 8.0 wt. percent barium, and had a total surface area as measured by nitrogen adsorption of 173 m.$^2$/g. The catalyst had a nickel surface area as measured by the H$_2$ chemisorption technique of 12.9 m.$^2$/g. after reduction in H$_2$ at 1000° F.

Example 2

The catalyst prepared in Example 1 was reduced with H$_2$ at 900° F. for 10 hours. Then 5.6 lbs. of n-hexane per lb. of catalyst was passed per hour over it at 900° F. (temperature of the lead bath into which reactor was immersed) and 700 p.s.i.g. along with 2 lbs. of water per lb. of hydrocarbon. The activity of the catalyst was measured as percent hexane conversion and the selectivity to H$_2$ measured as the mole ratio of H$_2$ to CH$_4$ in the dry gas product as follows:

| Percent conversion: | H$_2$/CH$_4$ mole ratio |
|---|---|
| 47.0 | 1.3 |
| 23.8 | 3.7 |
| 18.2 | 7.0 |
| 15.3 | 10.1 |
| 13.7 | 12.7 |
| 12.9 | 16.6 |
| 11.7 | 20.0 |
| 11.1 | 26.1 |

By controlling temperature and space velocity the conversion can be controlled to obtain an optimum conversion level, e.g., about 10 to 20%, so that the gas product has a desired high hydrogen content.

For comparison, a nickel-alumina catalyst prepared in a conventional manner and made to contain 25% nickel was tested using the same kind of feed with the same proportion of steam and space velocity as shown in Example 2. This catalyst was prereduced with H$_2$ at 900° F. The conversion levels were maintained in the range found optimum for the catalyst of Example 1, e.g., at about 12 to 15% conversion, and the gas product was analyzed for H$_2$/CH$_4$ mole ratio. The H$_2$/CH$_4$ mole ratio obtained with the conventional Ni-Al$_2$O$_3$ catalyst containing 25 wt. percent nickel was found to be far below the H$_2$/CH$_4$ mole ratio obtained with the catalyst of Example 1, for example, being only 1.65 at 15% conversion of the hexane feed and only about 3 at 11% conversion of the hydrogen feed. When a conventional type catalyst containing 35 wt. percent nickel was similarly tested under conditions comparable to those used in Example 2, the H$_2$/CH$_4$ mole ratio fell to below 1.0 at 17% conversion.

A number of high nickel-content Ni-Al$_2$O$_3$-Ba catalysts were prepared by the coprecipitation technique such as used in Example 1 with the same method of drying, calcining in air and reduction with hydrogen. The high nickel-content catalysts contained from 32.2 to 47.6 wt. percent nickel and from 2.9 to 17.9 wt. percent barium. Their nickel surface areas were in the range of 21.6 to 27.3 m.$^2$/g. Each of these catalysts was then tested for selectivity under the said conditions as shown in Example 2 and they were found to yield a gas product which has a low H$_2$/CH$_4$ mole ratio compared to the gas product obtained with the 19.6 wt. percent Ni catalyst, although these gas products are substantially higher in H$_2$/CH$_4$ mole ratio than the gas products obtained with a conventional high nickel-content catalyst.

The available data show that the catalysts preferably should contain an effective promoter such as barium, and preferably should be formed by the coprecipitation technique so that the nickel is interspersed with alumina. In using the coprecipitation technique, it is also preferred to avoid the presence of materials or substances which act as anti-catalysts or inhibitors, as for example, sodium. If a sodium compound is used as the precipitating agent, the precipitate obtained must be carefully washed free of sodium ions.

A typical gas product composition obtained at the 15% conversion level with the Ni-Al$_2$O$_3$-Ba catalyst of Example 1 is as follows:

Dry gas components (mole percent):
| | |
|---|---|
| H$_2$ | 71.0 |
| CH$_4$ | 7.0 |
| CO | 0.1 |
| CO$_2$ | 21.9 |
| B.t.u./ft.$^3$ with CO$_2$ | 290 |
| B.t.u./ft.$^3$ without CO$_2$ | 372 |

Thus, using the selective catalysts of low nickel-content interspersed with Al$_2$O$_3$, the reaction of the hydrocarbon feeds with steam can be carried out at conversion levels in the range of about 5 to 50% for obtaining a H$_2$-rich gas.

The gaseous product can be subjected to cooling under pressure to remove H$_2$O and unreacted hydrocarbons by condensation. In cooling the gas product, the heat can be transferred to the feed. The CO$_2$, CO and CH$_4$ can be removed by absorption and adsorption treatments to obtain a purified high pressure H$_2$ gas stream. An ultra pure H$_2$ stream may be obtained by passing the total gas through a palladium or palladium alloy diffuser through which the H$_2$ alone will diffuse. The unconverted liquid feed hydrocarbons separated from the gas product as a condensate may be recycled for further partial conversion by reaction with steam in the presence of the catalyst.

The invention described is claimed as follows:

1. In a process for producing a gas rich in hydrogen mixed with minor proportions of CO$_2$, CO, and CH$_4$ by partially reacting naphtha hydrocarbons containing principally C$_5$–C$_{10}$ paraffins with steam at 650° to 925° F. under a pressure of 150 to 1500 p.s.i.g., the improvement which comprises contacting the hydrocarbons and steam with a contact catalyst containing about 10 to 25 wt. percent of nickel interspersed with about 90 to 75 wt. percent alumina on a total nickel and alumina basis, said catalyst being activated to have a total surface area of about 100 to 300 m.$^2$/g. of catalyst and a nickel surface area of 5 to 20 m.$^2$/g. of catalyst, and controlling the space velocity, temperature and pressure to convert 5 to 50% of the hydrocarbon reactants to a gas product rich in hydrogen.

2. In a process as defined in claim 1, said contact catalyst containing an effective promoter metal selected from the class consisting of Ba, Sr, Cs, K, La, Y, Ce, Fe and Cu.

3. In a process as defined in claim 1, said contact catalyst containing 1 to 20 wt. percent of barium as a promoter based on total weight of the catalyst.

4. In a process as defined in claim 1, contacted with the catalyst at a space velocity of about 1 to 20 lbs. of hydrocarbon per hour per lb. of the catalyst and with steam in the amount of 1.5 to 3.0 lbs. per lb. of the naphtha hydrocarbon.

References Cited

UNITED STATES PATENTS

| | | | |
|---|---|---|---|
| 3,106,457 | 10/1963 | Lockerbie et al. | 23—212 |
| 3,119,667 | 1/1964 | McMahon. | |
| 3,162,606 | 12/1964 | Geraitis et al. | 252—459 |
| 3,201,214 | 8/1965 | Fox et al. | 48—214 |
| 3,271,325 | 9/1966 | Davies et al. | 48—214 |

JOSEPH SCOVRONEK, *Primary Examiner.*